United States Patent
Chatterji et al.

(10) Patent No.: US 7,612,021 B2
(45) Date of Patent: Nov. 3, 2009

(54) METHODS AND COMPOSITIONS UTILIZING LOST-CIRCULATION MATERIALS COMPRISING COMPOSITE PARTICULATES

(75) Inventors: Jiten Chatterji, Duncan, OK (US); Bobby King, Duncan, OK (US); Darrell C. Brenneis, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/844,926

(22) Filed: Aug. 24, 2007

(65) Prior Publication Data

US 2009/0054269 A1    Feb. 26, 2009

(51) Int. Cl.
*C09K 8/487*    (2006.01)

(52) U.S. Cl. .............. 507/204; 507/104; 507/112; 507/113; 507/114; 507/140; 507/143; 507/214; 507/215; 507/216; 507/217; 507/269; 507/271; 166/283; 166/293; 166/294; 166/295

(58) Field of Classification Search .............. None
See application file for complete search history.

(56) References Cited

U.S. PATENT DOCUMENTS

| | | | |
|---|---|---|---|
| 2,799,647 A * | 7/1957 | Borcherdt | 507/104 |
| 3,042,608 A | 7/1962 | Morris | |
| 3,220,863 A | 11/1965 | Mayhew | |
| 3,360,040 A | 12/1967 | Johnson | |
| 4,397,354 A * | 8/1983 | Dawson et al. | 166/294 |
| 4,498,995 A * | 2/1985 | Gockel | 507/100 |
| 4,503,170 A * | 3/1985 | Drake et al. | 523/130 |
| 4,515,216 A | 5/1985 | Childs | |
| 4,526,240 A * | 7/1985 | McKinley et al. | 175/72 |
| 4,560,527 A | 12/1985 | Harke | |
| 4,619,862 A | 10/1986 | Sokolowski | |
| 4,621,011 A | 11/1986 | Fleischer | |
| 4,721,059 A | 1/1988 | Lowe | |
| 4,957,174 A | 9/1990 | Whitfill | |
| 5,004,553 A * | 4/1991 | House et al. | 507/100 |

(Continued)

OTHER PUBLICATIONS

Production Data Sheet, Barofibre® Seepage Loss Additive, Halliburton Fluid Systems, Sep. 5, 2006.

(Continued)

*Primary Examiner*—James Seidleck
*Assistant Examiner*—John J Figueroa
(74) *Attorney, Agent, or Firm*—Craig W. Roddy; Tumey, LLP

(57) ABSTRACT

Disclosed embodiments relate to compositions and methods for using a composite particulate comprising a cellulosic fiber and a filler as a lost-circulation material. An example of a method of controlling lost circulation in a subterranean method, comprises contacting a subterranean formation with a fluid comprising a base fluid and a lost circulation material, wherein the lost circulation material comprises a composite particulate, and wherein the composite particulate comprises a cellulosic fiber and a filler. An example method of cementing comprises introducing a cement composition into a well bore penetrating a subterranean formation, wherein the cement compositions comprises a cement, water, and a lost-circulation material, and wherein the lost-circulation material comprises a lost-circulation material, and wherein the lost-circulation material comprises a cellulosic fiber and a filler. Example compositions include lost-circulation materials, treatment fluids and cement compositions.

23 Claims, 1 Drawing Sheet

U.S. PATENT DOCUMENTS

Figure 1:
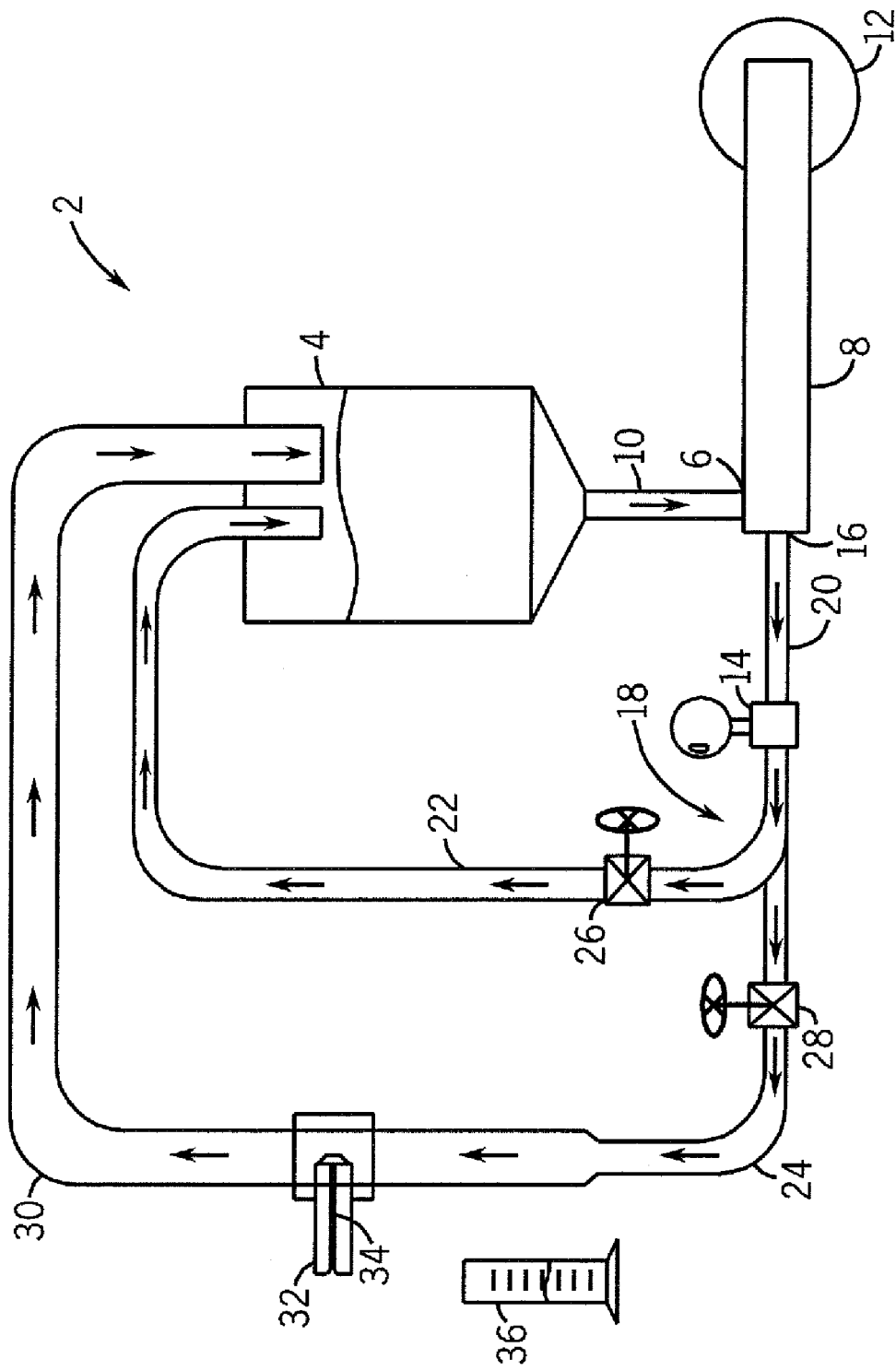

| | | | |
|---|---|---|---|
| 5,019,654 | A | 5/1991 | Baasner |
| 5,501,277 | A | 3/1996 | Onan et al. |
| 5,842,519 | A * | 12/1998 | Sydansk .................... 166/295 |
| 5,843,203 | A | 12/1998 | Lindsay |
| 5,981,446 | A * | 11/1999 | Qiu et al. .................... 507/209 |
| 6,035,936 | A * | 3/2000 | Whalen .................... 166/308.3 |
| 6,508,306 | B1 | 1/2003 | Reddy |
| 6,518,224 | B2 * | 2/2003 | Wood .......................... 507/118 |
| 6,582,819 | B2 * | 6/2003 | McDaniel et al. ........... 428/402 |
| 6,632,527 | B1 * | 10/2003 | McDaniel et al. ........... 428/402 |
| 6,662,749 | B1 | 12/2003 | Wiedenhaft |
| 6,861,392 | B2 | 3/2005 | Shaarpour |
| 6,881,708 | B2 | 4/2005 | Reddy |
| 6,902,002 | B1 | 6/2005 | Chatterji |
| 7,055,603 | B2 | 6/2006 | Caveny |
| 7,066,285 | B2 | 6/2006 | Shaarpour |
| 7,229,492 | B2 | 6/2007 | Chatterji |
| 7,270,879 | B2 * | 9/2007 | McCrary .................... 428/402 |
| 7,281,583 | B2 | 10/2007 | Whitfill et al. |
| 7,284,611 | B2 | 10/2007 | Reddy et al. |
| 7,297,208 | B2 | 11/2007 | Caveny et al. |
| 7,360,598 | B1 | 4/2008 | Lewis et al. |
| 7,455,106 | B2 * | 11/2008 | Veneruso et al. ......... 166/244.1 |
| 2003/0186819 | A1 | 10/2003 | Shaarpour |
| 2005/0170973 | A1 * | 8/2005 | Verret ........................ 507/107 |
| 2006/0096759 | A1 | 5/2006 | Reddy |
| 2006/0100318 | A1 * | 5/2006 | Williams et al. ............... 524/27 |
| 2006/0113078 | A1 * | 6/2006 | Nguyen et al. ........... 166/280.2 |
| 2006/0174802 | A1 | 8/2006 | Bedel |
| 2006/0213399 | A1 | 9/2006 | Caveny |
| 2006/0258546 | A1 * | 11/2006 | Brannon et al. ............. 507/269 |
| 2006/0283592 | A1 * | 12/2006 | Sierra et al. ................. 166/281 |
| 2007/0051516 | A1 | 3/2007 | Reddy |
| 2008/0230223 | A1 * | 9/2008 | McCrary et al. ......... 166/272.2 |

OTHER PUBLICATIONS

Barofibre® Lost Circulation and Seepage Loss Additive, Halliburton Fluid Systems, 2007 SDS-010 Jan. 2007.

Product Data Sheet, Barofibre® Superfine Seepage Loss Additive, Halliburton Fluid Systems, Apr. 2005.

Product Data Sheet, Steelseal® Lost Circulation Material, Halliburton Fluid Systems, Sep. 5, 2006.

Steelseal® Lost Circulation Material, High-Performance Resilient Lost Circulation Material for Loss Prevention, Rapid Remediation and Wellbore Strengthening, Halliburton Fluid Systems, 2006 SDS-057 Oct. 2006.

Engineered WellSET™ Treatment Service Helps Prevent Lost Circulation by Strengthening the Wellbore, Halliburton, 2007 SDS-058 Jul. 2007.

Cementing, Gilsonite Lost-Circulation Additive, Halliburton Fluid Systems, 2006 H02045 Jul. 2006.

Biodac® EPA Exemption, 2002 Kadant GranTek Inc.

Biodac® Composition and Properties, 2002 Kadant GranTek Inc.

Gra-sorb™ Material Safety Data Sheet, 2002 Kadant GranTek Inc.

About Us, 2002 Kadant GranTek Inc.

Biodac® Sample Applications, 2002 Kadant GranTek Inc.

Biodac® A Revolutionary Granular Carrier, 2002 Kadant GranTek Inc.

Biodac® Material Safety Data Sheet, 2002 Kadant GranTek Inc.

API Specification for Materials and Testing for Well Cements, API Sec. 10, 5$^{th}$ ed. Jul. 1, 1980 p. 7, 19-21.

Appendix A, API RP 13B-2, 2d ed; Dec. 1, 1991, pp. 6-8.

Samsuri, "Cheaper Cement Formulation for Lost Circulation Control," Universiti Teknologi Malaysia, and B.T.N. Phuong, Vietnam Petroleum Institute, 2002.

* cited by examiner

METHODS AND COMPOSITIONS UTILIZING LOST-CIRCULATION MATERIALS COMPRISING COMPOSITE PARTICULATES

BACKGROUND

The present invention relates to lost-circulation materials and, more particularly, in one or more exemplary embodiments, to methods and compositions that utilize lost-circulation materials comprising composite particulates.

Cement compositions are commonly utilized in subterranean methods, particularly subterranean well construction, completion, and remedial methods. For example, in subterranean well construction, a pipe string (e.g., casing and liners) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition sets in the annular space, thereby forming an annular sheath of hardened, substantially impermeable cement that supports and positions the pipe string in the well bore and bonds the exterior surface of the pipe string to the subterranean formation. Among other things, the annular sheath of set cement surrounding the pipe string functions to prevent the migration of fluids in the annulus, as well as protecting the pipe string from corrosion. Cement compositions also may be used in remedial cementing methods, such as in squeeze cementing and the placement of cement plugs.

In addition to cement compositions, drilling fluids are also used in subterranean methods. During the drilling of a well bore in a subterranean formation, a drilling fluid may be used to, among other things, cool the drill bit, lubricate the rotating drill string to prevent it from sticking to the walls of the well bore, prevent blowouts by serving as a hydrostatic head to counteract the sudden entrance into the well bore of high pressure formation fluids, and/or remove drill cuttings from the well bore. A drilling fluid may be circulated downwardly through a drill pipe and drill bit and then upwardly through the well bore to the surface. A variety of drilling fluids may be used during the drilling of well bores into a subterranean formation. For instance, the drilling fluid used may be any number of fluids (gaseous or liquid) and mixtures of fluids and solids (such as solid suspensions, mixtures, and emulsions).

One problem associated with subterranean methods may be the undesirable loss of at least a portion of the fluid (e.g., cement composition, drilling fluid, etc.) into the subterranean formation penetrated by the well bore. This problem may be referred to as "lost circulation" and the sections of the formation into which the fluid is lost may be referred to as "lost-circulation zones." A variety of factors may contribute to lost circulation. For example, subterranean formations traversed by well bores may be weak, highly permeable, and/or fractured. In some instances, the formations may be unable to withstand the hydrostatic pressure normally associated with the fluid being introduced into the well bore. For example, the hydrostatic pressure may be sufficient to breakdown the formation, thereby allowing the fluid to be lost into the formation. Furthermore, the hydrostatic pressure may be sufficient to force the fluid into natural or created fractures and/or permeable zones of the formation, resulting in loss of the fluid into the formation. The loss of the fluid may be undesirable for a number of reasons. For example, premature dehydration of a cement composition may occur due to loss of fluid from the composition into the formation, potentially leading to excessive viscosity and even potential termination of cementing. In addition to drilling fluids and cement compositions, problems with lost circulation may also be encountered with other fluids, such as completions fluids (e.g., completion brines), workover fluids and spacer fluids, that may be introduced into a well bore.

A number of methods have been employed to control lost circulation. One method involves the introduction of a settable composition into a lost-circulation zone to seal the zone, preventing and/or reducing the flow of the fluid into the zone. However, this method will typically require an undesired interruption in the subterranean method. Another method commonly involves contacting the lost-circulation zone with lost-circulation materials in an attempt to plug off and/or bridge fractures and/or permeable zones in the formation where the cement composition may be lost. To contact the lost-circulation zone, the lost-circulation materials may be included in the fluid that is introduced into the well bore. Examples of lost-circulation materials include ground coal, petroleum coke, sized calcium carbonate, asphaltenes, perlite, cellophane, plastic materials, ground oyster shells, ground nut hulls, flakes, fibers (e.g., polypropylene- or zirconium-coated glass fibers), and ground thermoset polymer laminates, such as laminates of paper or fabric with melamine resin.

SUMMARY

The present invention relates to lost-circulation materials and, more particularly, in one or more exemplary embodiments, to methods and compositions that utilize lost-circulation materials comprising composite particulates.

An exemplary embodiment of the present invention provides a method of controlling lost circulation in a subterranean method. The method comprises contacting a subterranean formation with a fluid comprising a base fluid and a lost-circulation material, wherein the lost-circulation material comprises a composite particulate, and wherein the composite particulate comprises a cellulosic fiber and a filler.

Another exemplary embodiment of the present invention provides a method of cementing. The method comprises introducing a cement composition into a well bore penetrating a subterranean formation, wherein the cement composition comprises a cement, water, and a lost-circulation material, wherein the lost-circulation material comprises a composite particulate, and wherein the composite particulate comprises a cellulosic fiber and a filler.

Another exemplary embodiment of the present invention provides a treatment fluid comprising a base fluid and a lost-circulation material. The lost-circulation material comprises a composite particulate, wherein the composite particulate comprises a cellulosic fiber and a filler.

Another exemplary embodiment of the present invention provides a cement composition comprising a cement, water, and a lost-circulation material. The lost-circulation material comprises a composite particulate, wherein the composite particulate comprises a cellulosic fiber and a filler.

Another exemplary embodiment of the present invention provide a lost-circulation material comprising a composite particulate, wherein the composite particulate comprises a cellulosic fiber and a filler.

The features and advantages of the present invention will be apparent to those skilled in the art upon reading the following description of specific embodiments with reference to the accompanying drawings.

DRAWINGS

These drawings illustrate certain aspects of the present invention disclosure and should not be used to limit or define the invention.

FIG. 1 is an illustration of an example test apparatus in accordance with an exemplary embodiment of the present invention.

DESCRIPTION OF SPECIFIC EMBODIMENTS

The present invention relates to lost-circulation materials and, more particularly, in one or more exemplary embodiments, to methods and compositions that utilize lost-circulation materials comprising composite particulates.

Composite particulates for use as a lost-circulation material, in accordance with exemplary embodiments, generally comprise cellulosic fiber and a filler. As will be discussed in more detail below, these composite particulates may be included in a variety of fluids used in subterranean methods to provide lost-circulation control. For example, it is believed that the composite particulates should effectively seal pores and/or fractures that may be present in subterranean formations such that the loss of fluid circulation into the formation is prevented and/or reduced.

One component of the composite particulates includes cellulosic fiber. The cellulosic fiber may be derived from any of a variety of plant products, including fiber from trees and plants, sugar beets, sugar cane, citrus pulp, potatoes, grains, peanut hulls, corn cobs, tobacco stems, apple pumice, natural grasses, cotton, peat, and the like, for example. An exemplary cellulosic fiber comprises paper fiber. In general, the composite particulates should contain at least about 10% by weight of the cellulosic fiber and, in exemplary embodiments, at least about 30% by weight of the cellulosic fiber. In exemplary embodiments, the cellulosic fiber may be present in the composite particulate in the range of from about 10% to about 99% by weight. By way of further example, the cellulosic fiber may be present in the composite particulate in the range of from about 75% to about 99% by weight. By way of further example, the cellulosic fiber may be present in the composite particulate in the range of from about 40% to about 80% by weight.

As described above, the composite particulates also include a filler. Examples of mineral fillers that may be present in the composite particulates include kaolin clay, calcium carbonate, barites, titanium dioxide, ground thermoset polymer laminates (e.g., laminates of paper or fabric with melamine resin), and combinations thereof. In exemplary embodiments, the filler may be present in the composite particulate in the range of from about 1% to about 90% by weight. By way of further example, the filler may be present in the composite particulate in the range of from about 1% to about 25% by weight. By way of further example, the filler may be present in the composite particulate in the range of from about 20% to about 60% by weight.

An exemplary composite particulate for use as a lost-circulation material comprises paper fiber in an amount of from about 47% to about 53% by weight, kaolin clay in an amount of from about 28% to about 34% by weight, calcium carbonate in an amount of from about 14% to about 20% by weight, and titanium dioxide in an amount up to about 1% by weight.

Another exemplary composite particulate for use as a lost-circulation material comprises paper fiber in an amount of about 50% by weight, kaolin clay in an amount of about 31% by weight, calcium carbonate in an amount of about 17% by weight, and titanium dioxide in an amount up to about 1% by weight.

The composite particulates generally should be sized to provide desirable levels of lost circulation control without undesirable interaction with equipment (e.g., pumps, drill bits, etc.) in which the composite particulates may come into contact. In exemplary embodiments, the composite particulates may have a particle size from about 4 mesh to about 60 mesh, U.S. Sieve Series. In exemplary embodiments, suitable composite particulates may have a particle size of about 4-45, about 10-30, about 12-20, about 20-50, or about 18-40 mesh. Those of ordinary skill in the art should be able to select an appropriate particle size for a particle application.

Exemplary composite particulates may be prepared using any suitable methodology. For example, the composite particulates may be prepared from primary paper sludge, secondary paper sludge, or combinations thereof. Slurries of other plant fibrous materials, such as wood pulp, citrus pulp, sugar beet, sugar cane, grain, potato, peanut hulls, corn cobs, tobacco stems, apple pumice, natural grasses, cotton, and peat, also may be used. Exemplary methods that may be used to prepare the composite particulates from paper sludge and slurries of plant fibrous materials are described in U.S. Pat. Nos. 5,019,564, 4,721,059, 4,621,011, 4,619,862, and 4,560,527, the entire disclosures of which are incorporated herein by reference.

An example of a suitable composite particulate is BIODAC cellulose complex available from Kadant GranTek Inc. BIODAC cellulose complex comprises paper fiber in an amount of from about 47% to about 53% by weight, kaolin clay in an amount of from about 28% to about 34% by weight, calcium carbonate in an amount of from about 14% to about 20% by weight, and titanium dioxide in an amount up to about 1% by weight. BIODAC cellulose complex is available in a variety of particle sizes, including 10-30, 12-20, and 20-50 mesh, U.S. Sieve Series.

Another example of a suitable composite particulate is GRAN-SORB cellulose complex from Kadant GranTek Inc. GRAN-SORB cellulose complex comprises paper fiber in an amount of from about 47% to about 53% by weight, kaolin clay in an amount of from about 28% to about 34% by weight, calcium carbonate in an amount of from about 14% to about 20% by weight, and titanium dioxide in an amount up to about 1% by weight. GRAN-SORB cellulose complex is available in a variety of particle sizes, including 4-45 mesh, U.S. Sieve Series.

The composite particulates may be included in any of a variety of treatment fluids in order to prevent and/or control lost circulation. It is believed that the composite particulates should effectively seal pores and/or fractures that may be present in subterranean formations, such that the loss of fluid circulation into the formation is prevented and/or reduced. By way of example, the composite particulates may be included in treatment fluids introduced into a subterranean, including drilling fluids, cement compositions, spacer fluids, completions fluids, and workover fluids. An example of a treatment fluid may comprise a base fluid and the composite particulate. In accordance with exemplary embodiments, the treatment fluid comprising the composite particulates may be introduced into a well bore that penetrates the subterranean formation. For example, the composite particulates may be included in a drilling fluid circulated in a well bore during the drilling of the well bore. By way of further example, the composition particulates may be included in a spacer fluid used to separate fluids in a well bore, such as a drilling fluid and a cement composition.

The amount of the composite particulates to include in the treatment fluids (e.g., drilling fluids, cement compositions, etc.) depends on a number of factors, including formation characteristics and conditions, the downhole equipment, the desired application, and other factors known to those skilled in the art. In exemplary embodiments, the composite particulates may be included in the treatment fluid in an amount of from about 4 pounds to about 240 pounds per barrel of the fluid. By way of further example, the composite particulates may be included in the treatment fluid in an amount of from about 4 pounds to about 60 pounds per barrel of the treatment fluid.

In addition to the composite particulates, an additional lost-circulation material also may be included in the treatment fluid (e.g., drilling fluid, cement composition, etc.). A variety of particulate materials may be suitable for use as the additional lost-circulation material, including, for example, ground coal, petroleum coke, sized calcium carbonate, asphaltenes (e.g., GILSONITE lost-circulation additive from Halliburton Energy Services), perlite, cellophane, vitrified shale, plastic materials, ground tires, ground oyster shells, ground nut hulls, flakes, fibers (e.g., polypropylene- or zirconium-coated glass fibers), ground thermoset polymer laminates, such as laminates of paper or fabric with melamine resin (e.g., PHENOSEAL lost circulation material from Forta Corporation), and combinations thereof. The additional lost-circulation material may be included in an amount of from about 2 pounds to about 120 pounds per barrel of the treatment fluid. By way of further example, the additional lost-circulation material may be included in the fluid in an amount of from about 2 pounds to about 30 pounds per barrel of the fluid.

As described above, the composite particulates may be included in a cement composition. Exemplary cement compositions may comprise cement, water, and the composite particulates. Those of ordinary skill in the art will appreciate that the exemplary cement compositions generally should have a density suitable for a particular application. By way of example, the cement composition may have a density of from about 4 pounds per gallon ("ppg") to about 20 ppg. In exemplary embodiments, the cement compositions may have a density of from about 8 ppg to about 17 ppg. Exemplary embodiments of the cement compositions may be foamed or unfoamed or may comprise other means to reduce their densities, such as hollow microspheres, low-density elastic beads, or other density-reducing additives known in the art. Those of ordinary skill in the art, with the benefit of this disclosure, will recognize the appropriate density for a particular application.

Any of a variety of cements suitable for use in subterranean cementing operations may be used in accordance with exemplary embodiments. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, silica cements and combinations thereof. In certain embodiments, the hydraulic cement may comprise a Portland cement. The Portland cements that may be suited for use in exemplary embodiments of the present invention are classified as Class A, C, H and G cements according to American Petroleum Institute, *API Specification for Materials and Testing for Well Cements*, API Specification 10, Fifth Ed., Jul. 1, 1990.

The water used in exemplary embodiments may be freshwater, saltwater, brines (e.g., water containing one or more salts dissolved therein), seawater, or combination thereof. In general, the water may be present in an amount sufficient to form a pumpable slurry. In exemplary embodiments, the water may be present in the cement compositions in an amount of from about 33% to about 200% by weight of the cement on a dry basis ("bwoc"). In exemplary embodiments, the water may be present in an amount of from about 35% to about 70% bwoc.

In addition, exemplary embodiments of the cement compositions comprise the composite particulates. As described above, exemplary composite particulates may be used as a lost circulation material to prevent and/or reduce the loss of the cementing composition into the subterranean formation. As will be appreciated, the composite particulates may be included in the cement compositions in an amount sufficient to provide a desirable level of loss-circulation control. In exemplary embodiments, the composite particulates may be included in the cement composition in an amount of from about 1% to about 15% bwoc. By way of further example, the composite particulates may be included in the cement composition in an amount of from about 4% to about 6% bwoc.

Other additives suitable for use in subterranean-cementing methods also may be added to exemplary embodiments of the cement compositions. Examples of such additives include additional lost-circulation materials, strength-retrogression additives, set accelerators, weighting agents, weight-reducing additives, heavyweight additives, filtration-control additives, dispersants, defoaming agents, foaming agents, and combinations thereof. Specific examples of these and other additives include crystalline silica, amorphous silica, salts, fibers, hydratable clays, vitrified shale, microspheres, fly ash, lime, latex, thixotropic additives, combinations thereof and the like. A person having ordinary skill in the art, with the benefit of this disclosure, will readily be able to determine the type and amount of additive useful for a particular application and desired result.

As will be appreciated by those of ordinary skill in the art, the exemplary cement compositions described herein may be used in a variety of subterranean applications, including primary cementing and remedial cementing. For example, the cement composition may be introduced into a subterranean formation and allowed to set therein. In primary-cementing methods, the cement compositions may be introduced into an annulus between a pipe string located in a subterranean formation and the subterranean formation and allowed to set therein. In addition, in remedial cementing methods, the cement compositions may be used, for example, in squeeze cementing or in the placement of cement plugs.

To facilitate a better understanding of the present technique, the following example of specific embodiments is given. In no way should the following example be read to limit, or to define, the scope of the invention.

EXAMPLE

Tests were conducted using various lost-circulation materials to determine the ability of the tested materials to plug a simulated fracture. For this series of tests, sample cement compositions were prepared that comprised Class H cement, 4 pounds of a lost-circulation material per 94-pound sack of the cement, and sufficient water to provide a density of about 16.4 ppg. After preparation, lost circulation tests were performed for each sample cement composition using the test apparatus and procedure described below.

Sample cement composition No. 1 comprised Class H cement, 4 pounds of a lost-circulation material per 94-pound sack of the cement, and sufficient water to provide a density of about 16.4 ppg. The lost-circulation material used in this sample comprised a mixture of GRAN-SORB cellulose complex (75%) and BIODAC cellulose complex (25%). As described above, GRAN-SORB cellulose complex is a composite particulate that is available from Kadant GranTek Inc. and that comprises comprise paper fiber in an amount of from about 47% to about 53% by weight, kaolin clay in an amount of from about 28% to about 34% by weight, calcium carbonate in an amount of from about 14% to about 20% by weight, and titanium dioxide in an amount up to about 1% by weight. As described above, BIODAC cellulose complex is a composite particulate that is available from Kadant GranTek Inc. and that comprises comprise paper fiber in an amount of from about 47% to about 53% by weight, kaolin clay in an amount of from about 28% to about 34% by weight, calcium carbonate in an amount of from about 14% to about 20% by weight, and titanium dioxide in an amount up to about 1% by weight. The mixture of the BIODAC cellulose complex and the GRAN-SORB cellulose complex used in this example had a particle size of 4-40 mesh.

Sample cement composition No. 2 comprised Class H cement, 4 pounds of GRAN-SORB cellulose complex per 94-pound sack of the cement, and sufficient water to provide a density of about 16.4 ppg.

Sample cement composition No. 3 comprised Class H cement, 4 pounds of GRAN-SORB cellulose complex per 94-pound sack of the cement, and sufficient water to provide a density of about 16.4 ppg. The particular GRAN-SORB cellulose complex used in this example had a particle size of 4-40 mesh and had been flattened to provide a generally plate-like shape.

Sample cement composition No. 4 comprised Class H cement, 4 pounds of a lost-circulation material per 94-pound sack of the cement, and sufficient water to provide a density of about 16.4 ppg. The lost-circulation material used in this sample comprised a mixture of GRAN-SORB cellulose complex (90%) and PHENOSEAL lost-circulation material (10%). As described above, PHENOSEAL lost-circulation material is a ground thermoset polymer laminate that is available from Forta Corporation. The particular PHENOSEAL lost-circulation material used in this example had a particle size of 10-40 mesh.

Sample cement composition No. 5 comprised Class H cement, 4 pounds of a lost-circulation material per 94-pound sack of the cement, and sufficient water to provide a density of about 16.4 ppg. The lost-circulation material used in this sample comprised a mixture of GRAN-SORB cellulose complex (80%) and PHENOSEAL lost-circulation material (20%).

Sample cement composition No. 6 comprised Class H cement, 4 pounds of a lost-circulation material per 94-pound sack of the cement, and sufficient water to provide a density of about 16.4 ppg. The lost-circulation material used in this sample comprised a mixture of GRAN-SORB cellulose complex (70%) and PHENOSEAL lost-circulation material (30%).

Sample cement composition No. 7 comprised Class H cement, 4 pounds of a lost-circulation material per 94-pound sack of the cement, and sufficient water to provide a density of about 16.4 ppg. The lost-circulation material used in this sample comprised a mixture of GRAN-SORB cellulose complex (50%) and ground oyster shells (50%). The ground oyster shells used in this example had a particle size of 4-40 mesh.

Sample cement composition No. 8 comprised Class H cement, 4 pounds of a lost-circulation material per 94-pound sack of the cement, and sufficient water to provide a density of about 16.4 ppg. The lost-circulation material used in this sample comprised a mixture of GRAN-SORB cellulose complex (50%) and fine ground oyster shells (50%). The fine ground oyster shells used in this example had a particle size of 10-40 mesh.

Sample cement composition No. 9 comprised Class H cement, 4 pounds of a GILSONITE lost-circulation additive per 94-pound sack of the cement, and sufficient water to provide a density of about 16.4 ppg. As described above, GILSONITE lost-circulation additive is an asphaltene in granular form that is available from Halliburton Energy Services, Inc. The particular GILSONITE lost-circulation additive used in this example had a particle size of 4-100 mesh.

FIG. 1 is an illustration of an example test apparatus in accordance with an exemplary embodiment of the present invention. The test apparatus is generally referred to by the reference number 2. As illustrated, the test apparatus 2 includes a 5-gallon cement reservoir 4 connected to an inlet 6 of a progressive-cavity pump 8 (a Mono Pump) via a pump-suction conduit 10. In this example, the pump-suction conduit 10 was a 0.75-inch flow line. The progressive-cavity pump 8 had a programmable flow rate and pressure. A motor 12 used to power the progressive-cavity pump 8. In this example, the motor 12 was a Roberson Meyer Model FS15D, 1.5-horsepower motor. A pressure transducer 14 was located at an outlet 16 of the progressive-cavity pump 8.

The outlet 16 of the progressive-cavity pump 8 was connected to a two-way split 18 via a pump-outlet conduit 20. In this example, the pump-outlet conduit 20 was a 0.75-inch flow line. The two-way split 18 divided the pump-outlet conduit 20 into a bypass conduit 22 and a primary-flow conduit 24. A bypass valve 26 was located in the bypass conduit 22 after the two-way split 18. In this example, the bypass conduit 22 was a 0.75-inch flow line that returned the sample cement composition to the cement reservoir 4. A flow valve 28 was located in the primary-flow conduit 24 after the two-way split 18. Accordingly, by appropriate manipulation of the bypass valve 26 and the flow valve 28, the progressive-cavity pump 8 could be used to direct flow to either the bypass conduit 22 or the primary-flow conduit 24.

In this example, the primary-flow conduit 24 enlarged from a 0.75-inch flow line to a 2-inch flow line after the flow valve 28. In the enlarged section 30 of the primary-flow conduit 24, a hollow core 32 was inserted, the hollow core 32 having a length of 4 inches and a diameter of 1.625 inches. To simulate a fracture, the hollow core 32 included a slot 34 having a height of 5 millimeters and a width of 3 centimeters. The slot 34 was parallel to the longitudinal axis of the hollow core 32. A cylinder 36 was placed below the slot 34 to collect any fluid flowing through the slot 34. After the hollow core 32, the enlarged section 30 of the primary-flow conduit 24 returned the sample cement composition to the cement reservoir 4.

The following test procedure was performed for each sample cement composition. First, 2 gallons of the sample cement composition were prepared and poured into the cement reservoir 4. With the flow valve 28 closed and the bypass valve 26 open, the progressive-cavity pump was started and a rate of 4 gallons per minute was established. After the constant flow rate was established, the flow valve 28 was opened and the bypass valve 26 was closed. This allowed the sample cement composition to flow through the primary-flow conduit 24 and past the slot 34 in the hollow core 32. As expected, there was initially a loss of the sample cement composition through the slot 34 in the hollow core 32. The slot 34 was observed to determine whether the lost-circulation material present in the sample cement composition plugged the slot 34, indicated by stoppage of loss through the slot 34. The time for each lost-circulation material to plug the slot 34 is listed below in Table 1.

After the slot 34 was plugged, the back pressure applied to the lost-circulation material plugging the slot 34 was increased to determine the ability of the lost-circulation material to withstand pressure. To increase the back pressure, the pressure applied by the progressive-cavity pump 8 was steadily increased while observing the slot 34 until the lost-circulation material failed, indicated by resumed loss of the sample cement composition through the slot 34. The maximum back pressure withstood by each lost-circulation material is listed below in Table 1.

TABLE 1

| Sample Composition | Lost-Circulation Material | Time to Plug Slot (sec) | Max. Back Pressure (psi) |
|---|---|---|---|
| 1 | 75% GRAN-SORB Cellulose Complex + 25% BIODAC Cellulose Complex | 40 | 10 |
| 2 | 100% GRAN-SORB Cellulose Complex | 37 | 18 |
| 3 | 100% GRAN-SORB Cellulose Complex[1] | 30 | 10 |
| 4 | 90% GRAN-SORB Cellulose Complex + 10% PHENOSEAL lost-circulation material | 23 | 20 |
| 5 | 80% GRAN-SORB Cellulose Complex + 20% PHENOSEAL lost-circulation material | 21 | 60 |
| 6 | 70% GRAN-SORB Cellulose Complex + 30% PHENOSEAL lost-circulation material | 40 | 100 |
| 7 | 50% GRAN-SORB Cellulose Complex + 50% Ground Oyster Shell | 5 | 100+ |
| 8 | 50% GRAN-SORB Cellulose Complex + 50% Fine Ground Oyster Shell | No plug after 43 seconds of flow | n/a |
| 9 | 100% GILSONITE lost-circulation additive | No plug after 58 seconds of flow | n/a |

[1]In Sample No. 3, the GRAN-SORB Cellulose Complex had been flattened to have a generally plate-like structure.

Accordingly, this example demonstrates that composite particulates comprising a cellulosic fiber and a filler provide desirable levels of loss-circulation control.

The particular embodiments disclosed above are illustrative only, as the present invention may be susceptible to various modifications and alternative forms. However, it should be understood that the invention is not intended to be limited to the particular embodiments disclosed. Rather, the present invention is to cover all modifications, equivalents and alternatives falling with the scope and spirit of the present invention as defined by the following appended claims. In addition, every range of values (of the form, "from about a to about b," or, equivalently, "from approximately a to b," or, equivalently, "from approximately a-b") disclosed in the present Description of Specific Embodiments is to be understood as referring to the power set (the set of all subsets) of the respective range of values, and set for the every range encompassed within the broader range of value.

What is claimed is:

1. A method of controlling lost circulation in a subterranean formation method, comprising:
   introducing a fluid into a well bore penetrating the subterranean formation, wherein the fluid comprises cement, a base fluid and a lost-circulation material, and allowing the fluid to set to form hardened cement, wherein the lost circulation material comprises a composite particulate, wherein the composite particulate comprises a cellulose fiber and a filler, and wherein the lost circulation material reduces and/or prevents loss of the fluid into the subterranean formation.

2. The method of claim 1, wherein the fluid is selected from the group consisting of a drilling fluid, a cement composition, a spacer fluid, a completion fluid, and a workover fluid.

3. The method of claim 1, wherein contacting the subterranean formation with the fluid comprises circulating the fluid in a well bore penetrating the subterranean formation during drilling of the well bore.

4. The method of claim 1, wherein the fluid is introduced into a space between the subterranean formation and a pipe string located in the well bore.

5. The method of claim 1, wherein the cellulosic fiber comprises paper fiber, and wherein the filler comprises kaolin clay and calcium carbonate.

6. The method of claim 1, wherein the cellulosic fiber comprises a paper fiber in an amount from about 47% to about 53% by weight of the composite particulate, and wherein the filler comprises kaolin clay in an amount from about 28% to about 34% by weight of the composite particulate, calcium carbonate in an amount from about 14% to about 20% by weight of the composite particulate, and titanium dioxide in an amount up to about 1% by weight of the composite particulate.

7. The method of claim 1, wherein the cellulosic fiber comprises a paper fiber, and wherein the filler comprises kaolin clay and calcium carbonate.

8. The method of claim 1, wherein the cement comprises a hydraulic cement.

9. The method of claim 1, wherein the cellulosic fiber comprises paper fiber.

10. The method of claim 1, wherein the cellulosic fiber is present in the composite particulate in an amount of at least about 30% by weight of the composite particulate.

11. The method of claim 1, wherein the filler is present in the composite particulate in an amount from about 20% to about 60% by weight of the composite particulate.

12. The method of claim 1, wherein the cellulosic fiber is present in the composite particulate in an amount from about 40% to about 80% by weight of the composite particulate, and wherein the filler is present in an amount from about 20% to about 60% by weight of the composite particulate.

13. The method of claim 1, wherein the filler comprises at least one material selected from the group consisting of kaolin clay, calcium carbonate, a barite, titanium dioxide, a ground thermoset polymer laminate, and combinations thereof.

14. The method of claim 1, wherein the cellulosic fiber comprises a paper fiber, and wherein the filler comprises kaolin clay and calcium carbonate.

15. The method of claim 1, wherein the cellulosic fiber comprise paper fiber, and wherein the filler comprises a ground laminate comprising melamine resin and at least one member selected from the group consisting of paper and fabric.

16. The method of claim 1, wherein the cellulosic fiber comprises a paper fiber in an amount from about 47% to about 53% by weight of the composite particulate, and wherein the filler comprises kaolin clay in an amount from about 28% to about 34% by weight of the composite particulate, calcium carbonate in an amount from about 14% to about 20% by weight of the composite particulate, and titanium dioxide in an amount up to about 1% by weight of the composite particulate.

17. The method of claim 1, wherein the composite particulate has a particle size from about 4 mesh to about 50 mesh and is present in the fluid in an amount from about 4 pounds to about 240 pounds per barrel of the fluid.

18. The method of claim 1, wherein the fluid comprises an additional lost-circulation material in an amount from about 2 pounds to about 120 pounds per barrel of the fluid.

19. The method of claim 1, wherein the fluid comprises at least one lost-circulation material selected from the group consisting ground coal, petroleum coke, sized calcium carbonate, an asphaltene, perlite, cellophane, vitrified shale, a plastic material, a ground tire, a ground oyster shell, a ground nut hull, a flake, a fiber, a ground thermoset polymer laminate, and combinations thereof.

20. A method of cementing, comprising:
   introducing a cement composition into a well bore penetrating a subterranean formation, wherein the cement composition comprises a cement, water, and a lost-circulation material wherein the lost circulation material comprises a particulate, and wherein the composite particulate comprises a cellulose fiber and a filler; and
   allowing the cement composition to set in the well bore.

21. The method of claim 20, wherein the cellulose fiber is present in the composite particulate in an amount from about 40% to about 80% by weight of the composite particulate, and wherein the filler is present in an amount from about 20% to about 60% by weight of the composite particulate.

22. The method of claim 20, wherein the cellulose fiber comprise a paper fiber, and wherein the filler comprises a ground laminate comprising melamine resin and at least one member selected from the group consisting of paper and fabric.

23. The method of claim 22, wherein the cellulose fiber comprises a paper fiber, and wherein the filler comprises kaolin clay and calcium carbonate.

* * * * *